(12) United States Patent
Cho (10) Patent No.: US 12,014,054 B2
(45) Date of Patent: Jun. 18, 2024

(54) MEMORY SYSTEM AND OPERATING METHOD THEREOF FOR PERFORMING RE-ORDERING OPERATION BASED ON TEMPERATURE INCREMENT

(71) Applicant: SK hynix Inc., Gyeonggi-do (KR)

(72) Inventor: Sung Yeob Cho, Gyeonggi-do (KR)

(73) Assignee: SK hynix Inc., Gyeonggi-Do (KR)

( * ) Notice: Subject to any disclaimer, the term of this patent is extended or adjusted under 35 U.S.C. 154(b) by 8 days.

(21) Appl. No.: 17/898,997

(22) Filed: Aug. 30, 2022

(65) Prior Publication Data
US 2023/0127204 A1    Apr. 27, 2023

(30) Foreign Application Priority Data
Oct. 26, 2021   (KR) .......................... 10-2021-0143459

(51) Int. Cl.
*G06F 3/06* (2006.01)

(52) U.S. Cl.
CPC .......... *G06F 3/0616* (2013.01); *G06F 3/0653* (2013.01); *G06F 3/0659* (2013.01); *G06F 3/0679* (2013.01)

(58) Field of Classification Search
CPC .... G06F 3/0616; G06F 3/0653; G06F 3/0659; G06F 3/0679; G06F 3/0625; G06F 3/0634; G06F 3/061; G06F 3/0604; G06F 3/0658; Y02D 10/00
See application file for complete search history.

(56) References Cited

U.S. PATENT DOCUMENTS

| | | | |
|---|---|---|---|
| 9,734,885 B1 * | 8/2017 | Healy | G11C 11/1693 |
| 9,959,936 B1 * | 5/2018 | Song | G06F 12/0246 |
| 10,216,660 B1 * | 2/2019 | Jonnala | G06F 3/0683 |
| 2006/0070074 A1 | 3/2006 | Maeda et al. | |
| 2017/0255389 A1 * | 9/2017 | Tan | G06F 3/0619 |
| 2019/0065086 A1 * | 2/2019 | Margetts | G06F 13/1668 |
| 2020/0050246 A1 * | 2/2020 | Karalnik | H05K 1/0203 |
| 2021/0255799 A1 * | 8/2021 | Kale | G06N 3/049 |
| 2022/0084567 A1 * | 3/2022 | Nair | G11C 16/10 |

* cited by examiner

*Primary Examiner* — Rocio Del Mar Perez-Velez
*Assistant Examiner* — Tong B. Vo
(74) *Attorney, Agent, or Firm* — IP & T GROUP LLP (57) ABSTRACT

A controller of a memory system includes a memory, a temperature increment estimating unit and a re-ordering unit. The memory includes a request queue configured to enqueue therein operation requests provided from a host device. The temperature increment estimating unit estimates temperature increments respectively corresponding to the operation requests. The re-ordering unit performs a re-ordering operation for re-arranging the operation requests enqueued in the request queue based on the temperature increments.

17 Claims, 8 Drawing Sheets

| TRANSMISSION SEQUENCE (PROCESSING TIME IN HIGH PERFORMANCE MODE) | SEQ_RD1 (10sec) | SEQ_RD2 (10sec) | SEQ_WT (10sec) | RAN_RD (5sec) |
|---|---|---|---|---|
| TEMPERATURE INCREMENT | +4°C | +4°C | +2°C | +1°C |
| TEMPERATURE CHANGE | 85°C → 89°C | 89°C → 93°C | 93°C → 95°C | 95°C → 96°C |
| PERFORMANCE MODE | HP | HP | HP | MP |
| PROCESSING TIME | 10sec | 10sec | 10sec | 10sec |

41

| RE-ORDERED SEQUENCE (PROCESSING TIME IN HIGH PERFORMANCE MODE) | SEQ_RD1 (10sec) | RAN_RD (5sec) | SEQ_WT (10sec) | SEQ_RD2 (10sec) | |
|---|---|---|---|---|---|
| TEMPERATURE INCREMENT | +4°C | +1°C | +2°C | +4°C | |
| TEMPERATURE CHANGE | 85°C → 89°C | 89°C → 90°C | 90°C → 92°C | 92°C → 95°C | 95°C → 96°C |
| PERFORMANCE MODE | HP | HP | HP | HP | MP |
| PROCESSING TIME | 10sec | 5sec | 10sec | 7.5sec | 5sec |

MEMORY SYSTEM AND OPERATING METHOD THEREOF FOR PERFORMING RE-ORDERING OPERATION BASED ON TEMPERATURE INCREMENT

CROSS-REFERENCE TO RELATED APPLICATION

The present application claims priority under 35 U.S.C. § 119(a) to Korean patent application number 10-2021-0143459, filed on Oct. 26, 2021, which is incorporated herein by reference in its entirety as set forth in full.

BACKGROUND

1. Technical Field

Various embodiments of the present disclosure relate to a memory system, and more particularly, to a memory system including a non-volatile memory device.

2. Related Art

A memory system may be configured to store data provided by a host device in response to a write request from the host device. Furthermore, the memory system may be configured to provide stored data to the host device in response to a read request from the host device. The host device is an electronic device capable of processing data and may include a computer, a digital camera or a mobile phone. To operate, the memory system may be mounted in the host device or may be fabricated to be capable of being connected to and detached from the host device.

An electronic device includes many electronic elements and a computer system as the electronic device includes many semiconductor apparatuses each configured by a semiconductor. Among the semiconductor apparatuses configuring the computer system, a host such as a processor or a memory controller performs data communication with a memory device. The memory device includes a plurality of memory cells each identified by a word line and a bit line and configured to store therein data.

SUMMARY

In an embodiment of the present disclosure, a controller of a memory system may include a memory, a temperature increment estimating unit and a re-ordering unit. The memory may include a request queue configured to enqueue therein, operation requests provided from a host device. The temperature increment estimating unit may be configured to estimate temperature increments respectively corresponding to the operation requests. The re-ordering unit may be configured to perform a re-ordering operation for re-arranging the operation requests enqueued in the request queue based on the temperature increments.

In an embodiment, an operating method of a controller of a memory system may include estimating temperature increments respectively corresponding to operation requests provided from a host device and performing a re-ordering operation for re-arranging the operation requests enqueued in a request queue based on the temperature increments.

In an embodiment of the present disclosure, a controller of a memory system may include a memory, a temperature increment estimating unit, a re-ordering unit and a performance adjusting unit. The memory may include a request queue configured to enqueue therein, operation requests provided from a host device. The temperature increment estimating unit may be configured to estimate temperature increments respectively corresponding to the operation requests. The re-ordering unit may be configured to re-arrange, when a temperature of the memory system becomes greater than a re-ordering trigger temperature, the operation requests enqueued in the request queue based on the temperature increments such that a temperature rise of the memory system is delayed. The performance adjusting unit may be configured to compare the temperature of the memory system with one or more performance adjustment trigger temperatures to change a performance mode of the memory system.

In an embodiment of the present disclosure, an operating method of a controller may include lowering performance of a memory device in a stepwise manner as a temperature of the memory device rises; and dequeuing enqueued requests to control the memory device to perform operations sequentially for the dequeued requests, the operations respectively causing temperature increments of the memory device. The enqueued requests may be sequentially dequeued in an ascending order of the temperature increments.

DETAILED DESCRIPTION

Various embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art.

The drawings are not necessarily to scale and, in some instances, proportions may have been exaggerated in order to clearly illustrate features of the embodiments. The terminology used herein is for the purpose of describing particular embodiments only and is not intended to be limiting of the disclosure.

As used herein, the term "and/or" includes at least one of the associated listed items. It will be understood that when an element is referred to as being "connected to", or "coupled to" another element, it may be directly on, connected to, or coupled to the other element, or one or more intervening elements may be present. As used herein, singular forms are intended to include the plural forms and vice versa, unless the context clearly indicates otherwise. It will be further understood that the terms "comprises," "comprising," "includes," and "including" when used in this specification, specify the presence of the stated elements and do not preclude the presence or addition of one or more other elements.

Hereinafter, various embodiments of the present disclosure will be described below with reference to the accompanying drawings.

In accordance with an embodiment, provided may be a controller of a memory system, the controller capable of delaying temperature rise of the memory system to provide an improved response performance to a host device, and an operating method of the controller.

Figure 1:
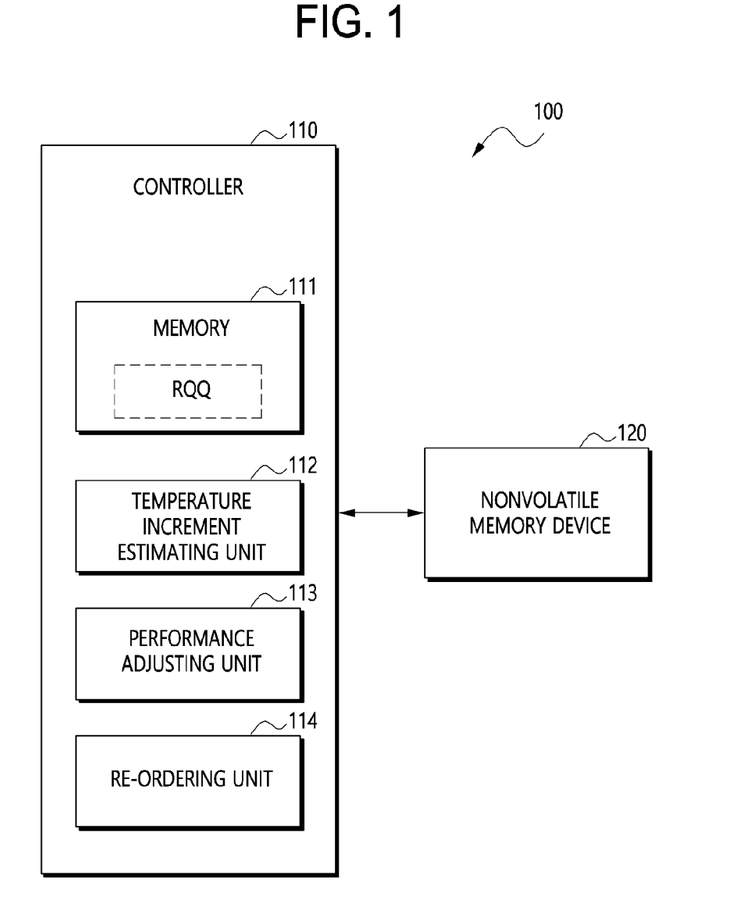
FIG. 1 is a block diagram illustrating a memory system in accordance with an embodiment of the present disclosure.

FIG. 1 is a block diagram illustrating a memory system 100 in accordance with an embodiment of the present disclosure.

The memory system 100 may be configured to store data, which is provided from an external host device, in response to a write request from the host device. The memory system 100 may be configured to provide a host device with data, which is stored therein, in response to a read request from the host device.

The memory system 100 may be configured as a personal computer memory card international association (PCMCIA) card, a compact flash (CF) card, a smart media card, a memory stick, various multimedia cards (e.g., MMC, eMMC, RS-MMC, and MMC-micro), secure digital (SD) cards (e.g., SD, Mini-SD and Micro-SD), a universal flash storage (UFS) or a solid state drive (SSD).

The memory system 100 may include a controller 110 and a non-volatile memory device 120.

The controller 110 may control an overall operation of the memory system 100. The controller 110 may control the non-volatile memory device 120 in order to perform a foreground operation in response to an instruction from a host device. The foreground operation may include operations of writing data in the non-volatile memory device 120 and reading data from the non-volatile memory device 120 in response to instructions from a host device, that is, a write request and a read request.

Furthermore, the controller 110 may control the non-volatile memory device 120 in order to perform an internally necessary background operation independently of a host device. The background operation may include at least one among a wear-leveling operation, a garbage collection operation, an erase operation, a read reclaim operation and a refresh operation for the non-volatile memory device 120. Like the foreground operation, the background operation may include operations of writing data in the non-volatile memory device 120 and reading data from the non-volatile memory device 120.

The controller 110 may include a memory 111, a temperature increment estimating unit 112, a performance adjusting unit 113 and a re-ordering unit 114.

The memory 111 may operate as an operational memory, a buffer memory or a cache memory for the controller 110. As an operational memory, the memory 111 may store therein various software program and various program data executed by the controller 110. As a buffer memory, the memory 111 may buffer data to be transferred between a host device and the non-volatile memory device 120. As a cache memory, the memory 111 may temporarily store therein cache data. The memory 111 may include a request queue RQQ. The request queue RQQ may enqueue therein and dequeue therefrom operation requests provided from a host device. Operation requests may be enqueued in the request queue RQQ sequentially in order that the operation requests are provided from a host device. However, as described later, the enqueued operation requests may be re-arranged in the request queue RQQ by a re-ordering operation of the re-ordering unit 114.

The temperature increment estimating unit 112 may estimate temperature increments respectively corresponding to the operation requests enqueued in the request queue RQQ. A temperature increment corresponding to an operation request may be a temperature amount of the memory system 100, the temperature amount being estimated to increase as the corresponding operation request is processed. According to an embodiment, the temperature increment estimating unit 112 may estimate or calculate a temperature increment corresponding to an operation request whenever receiving the corresponding operation request from a host device. According to an embodiment, the temperature increment estimating unit 112 may calculate temperature increments respectively corresponding to operation requests enqueued in the request queue RQQ when the re-ordering unit 114 determines to perform a re-ordering operation, which will be described later.

The performance adjusting unit 113 may compare a temperature of the memory system 100 with one or more performance adjustment trigger temperatures to perform a performance adjustment operation for adjusting performance of the memory system 100. The performance adjusting unit 113 may perform the performance adjustment operation by selecting one of a plurality of performance modes and controlling the memory system 100 to operate in the selected performance mode. The temperature of the memory system 100 may be measured by a temperature sensor (not illustrated) provided within the memory system 100.

The re-ordering unit 114 may perform a re-ordering operation for re-arranging the operation requests, which are enqueued in the request queue RQQ, based on the temperature increments respectively corresponding to the enqueued operation requests, the temperature increments being estimated by the temperature increment estimating unit 112. The re-ordering unit 114 may perform the re-ordering operation by re-arranging the operation requests enqueued in the request queue RQQ such that an operation request corresponding to a least temperature increment is re-arranged to be dequeued first from the request queue RQQ among the enqueued operation requests. The re-ordering unit 114 may perform the re-ordering operation by re-arranging, in the ascending order of the temperature increments, the operation requests enqueued in the request queue RQQ such that an operation request corresponding to a smaller temperature increment is re-arranged to be dequeued earlier than an operation request corresponding to a greater temperature increment from the request queue RQQ among the operation requests enqueued in the request queue RQQ. The re-ordering unit 114 may perform a re-ordering operation on the operation requests enqueued in the request queue RQQ such that a random request (i.e., a random read request and/or a random write request) is re-arranged to be dequeued earlier than a sequential request (i.e., a sequential read request and/or a sequential write request) from the request queue RQQ among the enqueued operation requests. In general, a user actually experiences a response delay with respect to the random request more than a response delay with respect to the sequential request. When the temperature increments respectively corresponding to a random request and a sequential request have the same value among the operation requests enqueued in the request queue RQQ, the re-ordering unit 114 may perform the re-ordering operation such that the random request is re-arranged to be dequeued earlier than the sequential request from the request queue RQQ. The re-ordering unit 114 may perform the re-ordering operation such that a temperature of the memory system 100 slowly rises. The re-ordering unit 114 may perform the re-ordering operation such that as many as possible of the enqueued operation requests are processed before a performance adjustment operation for changing the performance mode of the memory system 100 to a lower mode.

According to an embodiment, the re-ordering unit 114 may perform the re-ordering operation when a predetermined re-ordering trigger condition is satisfied. The re-ordering trigger condition may include when the temperature of the memory system 100 becomes greater than a re-ordering trigger temperature. As long as the re-ordering trigger condition stays satisfied, the re-ordering unit 114 may perform the re-ordering operation whenever an operation request is provided from a host device.

According to an embodiment, the re-ordering trigger temperature may be a first performance adjustment trigger temperature having a lowest value among the performance adjustment trigger temperatures, which is referred to during the performance adjustment operation. According to an embodiment, the re-ordering trigger temperature may be lower than the first performance adjustment trigger temperature. According to an embodiment, the re-ordering trigger temperature may be one of the performance adjustment trigger temperatures, which are referred to during the performance adjustment operation.

According to a control of the controller 110, the non-volatile memory device 120 may store therein data provided from the controller 110 and may read data stored therein and provide the read data to the controller 110.

The non-volatile memory device 120 may include a flash memory device (e.g., a NAND Flash or a NOR Flash), a Ferroelectrics Random Access Memory (FeRAM), a Phase-Change Random Access Memory (PCRAM), a Magnetic Random Access Memory (MRAM), a Resistive Random Access Memory (ReRAM) and so forth.

The non-volatile memory device 120 may include one or more planes, one or more memory chips, one or more memory dies or one or more memory packages.

Figure 2:
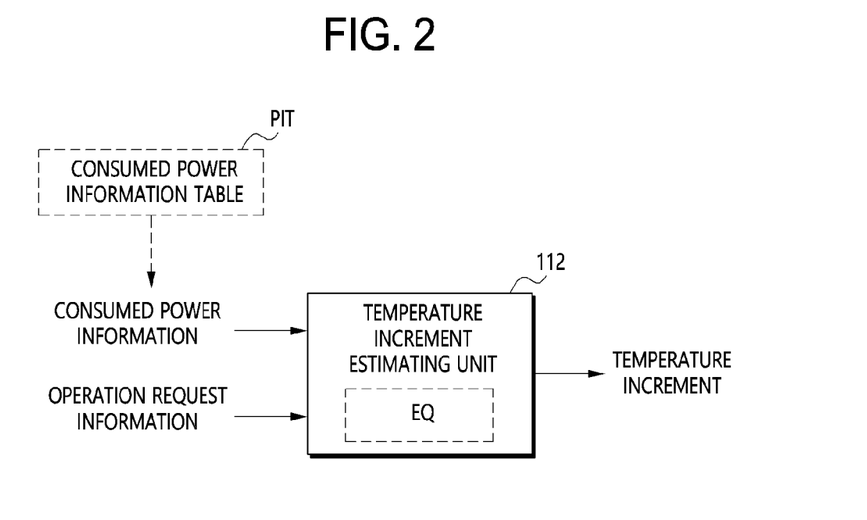
FIG. 2 is a diagram illustrating an operation of a temperature increment estimating unit of FIG. 1 in accordance with an embodiment of the present disclosure.

FIG. 2 is a diagram illustrating an operation of the temperature increment estimating unit 112 of FIG. 1 in accordance with an embodiment of the present disclosure.

Referring to FIG. 2, the temperature increment estimating unit 112 may calculate a temperature increment corresponding to an operation request provided from a host device based on consumed power information and operation request information corresponding to the operation request.

The temperature increment estimating unit 112 may refer to a consumed power information table PIT to obtain the consumed power information corresponding to the operation request. The consumed power information table PIT may include information pieces of consumed power corresponding to respective types of operations. For example, the types of operations may include a sequential read operation, a sequential write operation, a random read operation and a random write operation. An information piece of consumed power corresponding to each type of operation may include information of average consumed power and/or peak consumed power to be consumed to perform the operation on a process unit, e.g., a predetermined data size. The consumed power information table PIT may be managed in the memory 111 and/or in the non-volatile memory device 120. The consumed power information table PIT may be predetermined through a test.

The operation request information corresponding to an operation request may include information of data size to be processed through the operation request.

For example, when the operation request is a sequential read request, the consumed power information corresponding to the operation request may include information of an average consumed power of a sequential read operation and the operation request information corresponding to the operation request may include information of size of data to be read from the non-volatile memory device 120 through the sequential read operation.

In order to calculate the temperature increment corresponding to the operation request, the temperature increment estimating unit 112 may refer to a predetermined equation EQ related to the consumed power information and the operation request information. The equation EQ may be predetermined through a test.

Figure 3:
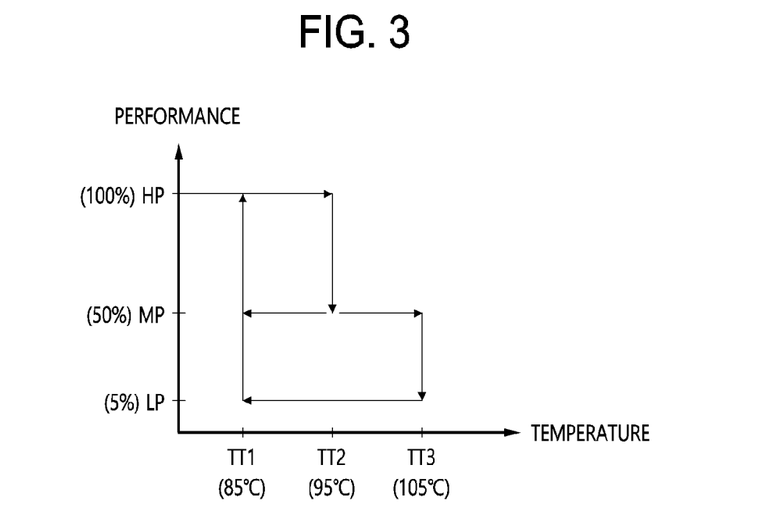
FIG. 3 is a diagram illustrating an operation of a performance adjusting unit of FIG. 1 in accordance with an embodiment of the present disclosure.

FIG. 3 is a diagram illustrating an operation of the performance adjusting unit 113 of FIG. 1 in accordance with an embodiment of the present disclosure.

Referring to FIG. 3, the performance adjusting unit 113 may determine a performance mode of the memory system 100 according to a temperature of the memory system 100. The performance adjusting unit 113 may compare the temperature of the memory system 100 with first to third performance adjustment trigger temperatures TT1 to TT3 to select one of a high performance mode HP, an intermediate performance mode MP and a low performance mode LP, and may control the memory system 100 to operate in the selected performance mode. For example, the first to third performance adjustment trigger temperatures TT1 to TT3 may be respectively 85° C., 95° C. and 105° C. For example, in the high performance mode HP, the intermediate performance mode MP and the low performance mode LP, the memory system 100 may operate according to 100%, 50% and 5% of full performance of the memory system 100, respectively.

Specifically, until the temperature of the memory system 100 rises to 95° C., the memory system 100 may operate in the high performance mode HP. When the temperature of the memory system 100 goes up to 95° C., the performance mode of the memory system 100 may change from the high performance mode HP to the intermediate performance mode MP. After the change of the performance mode of the memory system 100 to the intermediate performance mode MP, the memory system 100 may stay in the intermediate performance mode MP while the temperature of the memory system 100 stays in the range between 85° C. and 105° C. When the temperature of the memory system 100 in the intermediate performance mode MP reaches 85° C., the performance mode of the memory system 100 may change to the high performance mode HP. When the temperature of the memory system 100 in the intermediate performance mode MP reaches 105° C., the performance mode of the memory system 100 may change to the low performance mode LP. After the change of the performance mode of the memory system 100 to the low performance mode LP, the memory system 100 may stay in the low performance mode LP until the temperature of the memory system 100 goes down to 85° C. When the temperature of the memory system 100 in the low performance mode LP reaches 85° C., the performance mode of the memory system 100 may change to the high performance mode HP.

In order to adjust the performance of the memory system 100, the performance adjusting unit 113 may control an operational frequency and a number of allowed resources. For example, the memory system 100 may operate in a lower performance mode as the operational frequency and/or the number of allowed resources become smaller.

According to an embodiment, the number of the performance is modes and the number of the performance adjustment trigger temperatures may be determined differently from the illustration of FIG. 3.

Figure 4:
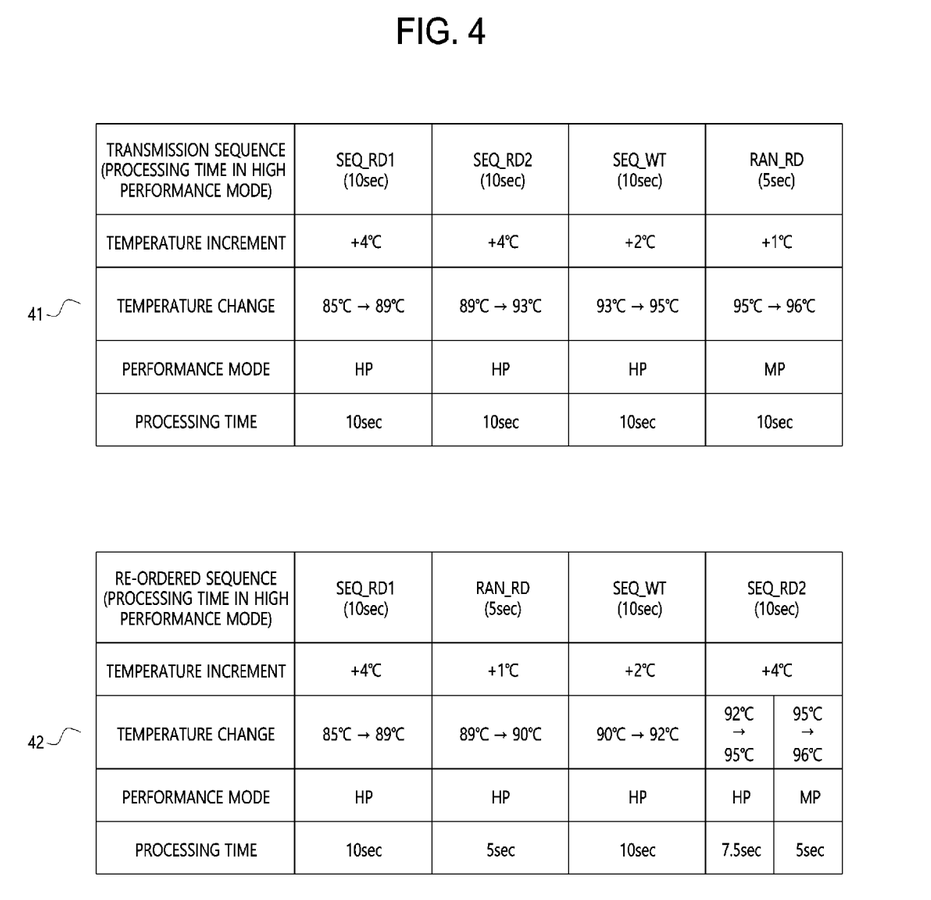
FIG. 4 is a diagram illustrating an operation of a re-ordering unit of FIG. 1 in accordance with an embodiment of the present disclosure.

FIG. 4 is a diagram illustrating an operation of the re-ordering unit 114 of FIG. 1 in accordance with an embodiment of the present disclosure. Referring to FIG. 4, case 41 represents a situation that the re-ordering operation is not performed, and case 42 represents a situation that the re-ordering operation is performed.

Referring to case 41, the controller 110 may sequentially receive, from a hot device, a first sequential read request SEQ_RD1, a second sequential read request SEQ_RD2, a sequential write request SEQ_WT and a random read request RAN_RD. The first sequential read request SEQ_RD1, the second sequential read request SEQ_RD2, the sequential write request SEQ_WT and the random read request RAN_RD may be sequentially enqueued in the request queue RQQ in the sequence that the controller 110 sequentially receives them. FIG. 4 illustrates a processing time amount taken for the memory system 100 to process a corresponding operation request in the high performance mode HP. Hereinafter, in the high performance mode HP and the intermediate performance mode MP, the memory system 100 may operate respectively according to 100% and 50% of the full performance of the memory system 100, as illustrated in FIG. 3.

The temperature increment estimating unit 112 may estimate the temperature increment corresponding to each operation request. For example, the temperature increment estimating unit 112 may estimate that the temperature of the memory system 100 rises by an amount of 4° C. because of the process for the first sequential read request SEQ_RD1. Also, the temperature increment estimating unit 112 may estimate that the temperature of the memory system 100 rises by an amount of 4° C. because of the process for the second sequential read request SEQ_RD2. Also, the temperature increment estimating unit 112 may estimate that the temperature of the memory system 100 rises by an amount of 2° C. because of the process for the sequential write request SEQ_WT. Also, the temperature increment estimating unit 112 may estimate that the temperature of the memory system 100 rises by an amount of 1° C. because of the process for the random read request RAN_RD.

When the re-ordering operation is not performed by the re-ordering unit 114, the first sequential read request SEQ_RD1, the second sequential read request SEQ_RD2 and the sequential write request SEQ_WT may be processed in the sequence of the transmission. During the process, the temperature of the memory system 100 may not go up to the second performance adjustment trigger temperature TT2, i.e., 95° C. and therefore the first sequential read request SEQ_RD1, the second sequential read request SEQ_RD2 and the sequential write request SEQ_WT may be processed in the high performance mode HP. When the temperature of the memory system 100 goes up to 95° C. after the completion of the process for the sequential write request SEQ_WT, the performance mode of the memory system 100 may change from the high performance mode HP to the intermediate performance mode is MP. Therefore, as much as 100% of the random read request RAN_RD may be processed in the intermediate performance mode MP. The processing time amount taken for the memory system 100 to process as much as 100% of the random read request RAN_RD may be 5 seconds in the high performance mode HP. However, as much as 100% of the random read request RAN_RD may be processed in the intermediate performance mode MP due to the performance adjustment operation and thus the processing time amount taken for the memory system 100 to process as much as 100% of the random read request RAN_RD may be 10 seconds. That is, when the performance of the memory system 100 decreases to 50% of the full performance, the processing time amount taken for the memory system 100 to process as much as 100% of the random read request RAN_RD may be doubled.

For a clear description on the case 42, the temperature of the memory system 100 goes up in proportion to a progress ratio for an operation request which is processed (i.e., a progress ratio for an operation which is performed in response to the operation request). For example, when as much as 50% of an operation request is processed, the temperature of the memory system 100 may go up by 50% of the temperature increment corresponding to the operation request.

The operation of the re-ordering unit 114 is as follows. The re-ordering unit 114 may perform the re-ordering operation when the temperature of the memory system 100 becomes greater than the re-ordering trigger temperature. For example, the re-ordering trigger temperature may be the first performance adjustment trigger temperature TT1, i.e., 85° C. Therefore, the re-ordering unit 114 may perform the re-ordering operation when the temperature of the memory system 100 goes up from 85° C. to 89° C. as the first sequential read request SEQ_RD1 is processed. Specifically, the re-ordering unit 114 may perform the re-ordering operation by changing the sequence of the random read request RAN_RD and the second sequential read request SEQ_RD2. That is, the re-ordering unit 114 may perform the re-ordering operation such that the random read request RAN_RD, which corresponds to the least temperature increment, is re-arranged to be dequeued first from the request queue RQQ among the second sequential read request SEQ_RD2, the sequential write request SEQ_WT and the random read request RAN_RD that are enqueued in the request queue RQQ. The re-ordered sequence of the case 42 may be a result of re-arranging the second sequential read request SEQ_RD2, the sequential write request SEQ_WT and the random read request RAN_RD, which are enqueued in the request queue RQQ and arranged in the sequence of the case 41, in the ascending order of the temperature increments such that the random read request RAN_RD corresponding to a smaller temperature increment is re-arranged to be dequeued earlier than the sequential write request SEQ_WT and the second sequential read request SEQ_RD2 each corresponding to a greater temperature increment from the request queue RQQ among the second sequential read request SEQ_RD2, the sequential write request SEQ_WT and the random read request RAN_RD enqueued in the request queue RQQ.

After the re-ordering operation, the random read request RAN_RD and the sequential write request SEQ_WT may be sequentially processed. During the process, the temperature of the memory system 100 may go up to 92° C., which is not yet the second performance adjustment trigger temperature TT2, i.e., 95° C., and therefore the memory system 100 may keep operating in the high performance mode HP. When as much as 75% of the second sequential read request SEQ_RD2 is processed, the temperature of the memory system 100 may go up to 95° C. Therefore, the performance mode of the memory system 100 may change from the high performance mode HP to the intermediate performance mode MP and as much as the remaining 25% of the second sequential read request SEQ_RD2 may be processed in the intermediate performance mode MP. The processing time amount taken for the memory system 100 to process as much as 100% of the second sequential read request SEQ_RD2 may be 10 seconds in the high performance mode HP. However, as much as 75% of the second sequential read request SEQ_RD2 may be processed in the high performance mode HP and as much as the remaining 25% may be processed in the intermediate performance mode MP due to the performance adjustment operation and thus the amount of processing time taken for the memory system 100 to process the second sequential read request SEQ_RD2 may be 12.5 seconds.

When comparing the cases 41 and 42, the temperature rise is of the memory system 100 may be delayed through the re-ordering operation. That is, through the re-ordering operation, as many as possible of the operation requests may be processed before a performance adjustment operation for changing the performance mode of the memory system 100 to a lower mode. Furthermore, as a result of the re-ordering operation, a total processing time amount for the operation requests enqueued in the request queue RQQ may be reduced and therefore the response performance to a host device may be improved.

Figure 5:
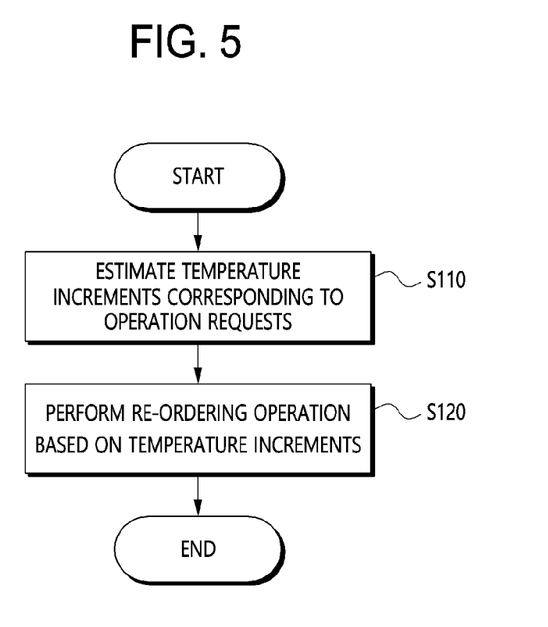
FIG. 5 is a flowchart illustrating an operation of a controller in accordance with an embodiment of the present disclosure.

FIG. 5 is a flowchart illustrating an operation of the controller 110 in accordance with an embodiment of the present disclosure.

Referring to FIG. 5, in an operation S110, the temperature increment estimating unit 112 may estimate the temperature increments respectively corresponding to an operation request provided from a host device. A temperature increment corresponding to an operation request may be an amount of a temperature of the memory system 100, the temperature amount being estimated to increase as the corresponding operation request is processed.

In an operation S120, the re-ordering unit 114 may perform a re-ordering operation for re-arranging the operation requests, which are enqueued in the request queue RQQ, based on the temperature increments respectively corresponding to the enqueued operation requests, the temperature increments being estimated by the temperature increment estimating unit 112. According to an embodiment, the re-ordering unit 114 may perform the re-ordering operation when the re-ordering trigger condition is satisfied.

Figure 6:
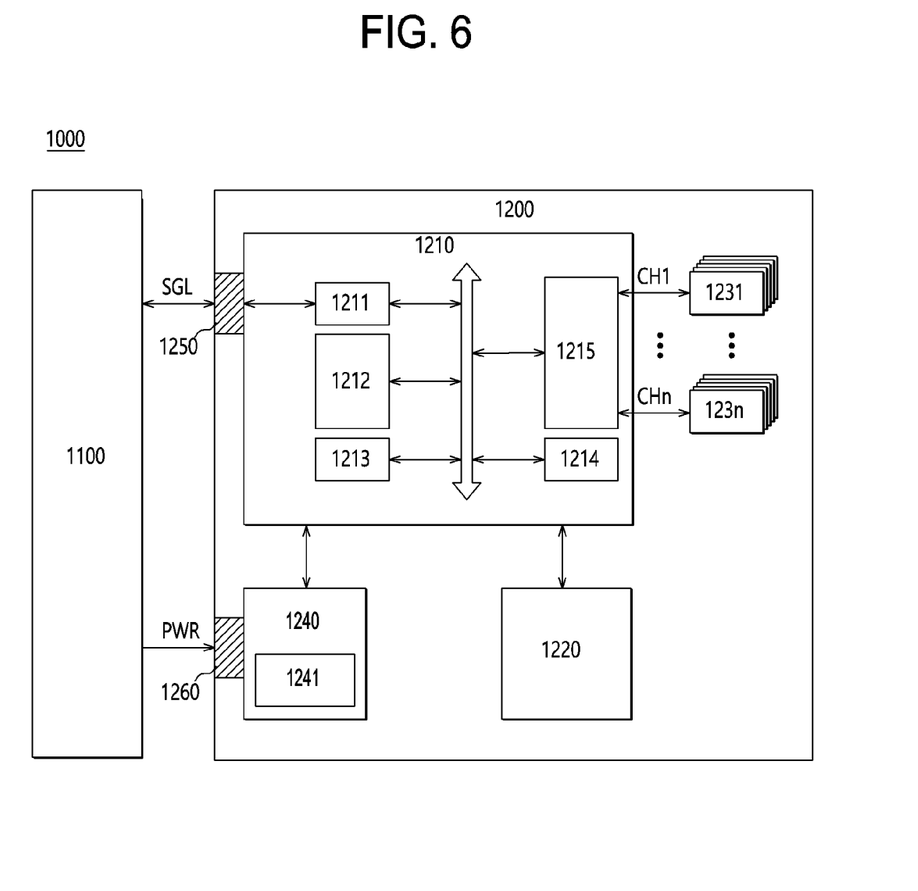
FIG. 6 is a diagram illustrating a data processing system including a solid state drive (SSD) in accordance with an embodiment of the present disclosure.

FIG. 6 is a diagram illustrating a data processing system 1000 including a solid state drive (SSD) 1200 in accordance with an embodiment of the present disclosure. Referring to FIG. 6, the data processing system 1000 may include a host device 1100 and the SSD 1200.

The SSD 1200 may include a controller 1210, a buffer memory device 1220, a plurality of nonvolatile memory devices 1231 to 123n, a power supply 1240, a signal connector 1250, and a power connector 1260.

The controller 1210 may control general operations of the SSD 1200. The controller 1210 may include a host interface unit 1211, a control unit 1212, a random access memory 1213, an error correction code (ECC) unit 1214, and a memory interface unit 1215.

The host interface unit 1211 may exchange a signal SGL with the host device 1100 through the signal connector 1250. The signal SGL may include a command, an address, data, and so forth. The host interface unit 1211 may interface the host device 1100 and the SSD 1200 according to the protocol of the host device 1100. For example, the host interface unit 1211 may communicate with the host device 1100 through any one of standard communication interfaces or protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnect (PCI), PCI express (PCI-e or PCIe) and universal flash storage (UFS).

The control unit 1212 may analyze and process the signal SGL received from the host device 1100. The control unit 1212 may control operations of internal function blocks according to a firmware or a software for driving the SSD 1200. The random access memory 1213 may be used as a working memory for driving such a firmware or software. The control unit 1212 may include a temperature increment estimating unit 112, a performance adjusting unit 113 and a re-ordering unit 114 shown in FIG. 1.

The ECC unit 1214 may generate the parity data of data to be transmitted to at least one of the nonvolatile memory devices 1231 to 123n. The generated parity data may be stored together with the data in the nonvolatile memory devices 1231 to 123n. The ECC unit 1214 may detect an error of the data read from at least one of the nonvolatile memory devices 1231 to 123n, based on the parity data. If a detected error is within a correctable range, the ECC unit 1214 may correct the detected error.

The memory interface unit 1215 may provide control signals such as commands and addresses to at least one of the nonvolatile memory devices 1231 to 123n, according to control of the control unit 1212. Moreover, the memory interface unit 1215 may exchange data with at least one of the nonvolatile memory devices 1231 to 123n, according to control of the control unit 1212. For example, the memory interface unit 1215 may provide the data stored in the buffer memory device 1220, to at least one of the nonvolatile memory devices 1231 to 123n, or provide the data read from at least one of the nonvolatile memory devices 1231 to 123n, to the buffer memory device 1220.

The buffer memory device 1220 may temporarily store data to be stored in at least one of the nonvolatile memory devices 1231 to 123n. Further, the buffer memory device 1220 may temporarily store the data read from at least one of the nonvolatile memory devices 1231 to 123n. The data temporarily stored in the buffer memory device 1220 may be transmitted to the host device 1100 or at least one of the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 7:
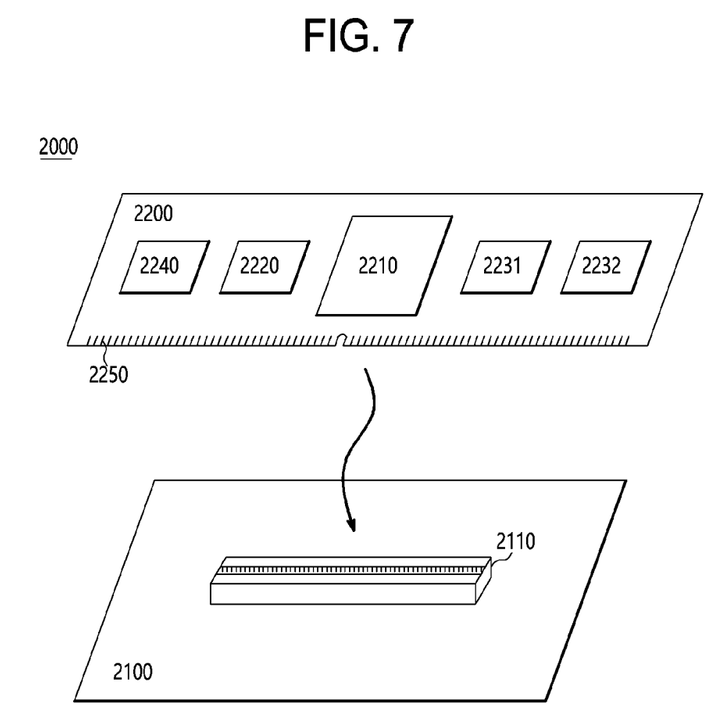
FIG. 7 is a diagram illustrating a data processing system including a memory system in accordance with an embodiment of the present disclosure.

FIG. 7 is a diagram illustrating a data processing system 2000 including a memory system 2200 in accordance with an embodiment of the present disclosure. Referring to FIG. 7, the data processing system 2000 may include a host device 2100 and the memory system 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The memory system 2200 may be mounted to the connection terminal 2110.

The memory system 2200 may be configured in the form of a board such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control general operations of the memory system 2200. The controller 2210 may be configured in the same manner as the controller 1210 shown in FIG. 6.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so forth, and power may be transferred between the host device 2100 and the memory system 2200. The connection terminal 2250 may be configured into various types depending on an interface scheme between the host device 2100 and the memory system 2200. The connection terminal 2250 may be disposed on any side of the memory system 2200.

Figure 8:
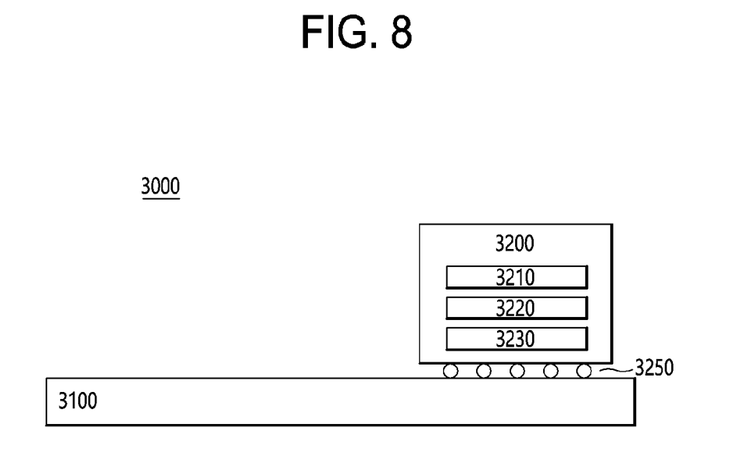
FIG. 8 is a diagram illustrating a data processing system including a memory system in accordance with an embodiment of the present disclosure.

FIG. 8 is a diagram illustrating a data processing system 3000 including a memory system 3200 in accordance with an embodiment of the present disclosure. Referring to FIG. 8, the data processing system 3000 may include a host device 3100 and the memory system 3200.

The host device 3100 may be configured in the form of a board such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control general operations of the memory system 3200. The controller 3210 may be configured in the same manner as the controller 1210 shown in FIG. 6.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 9:
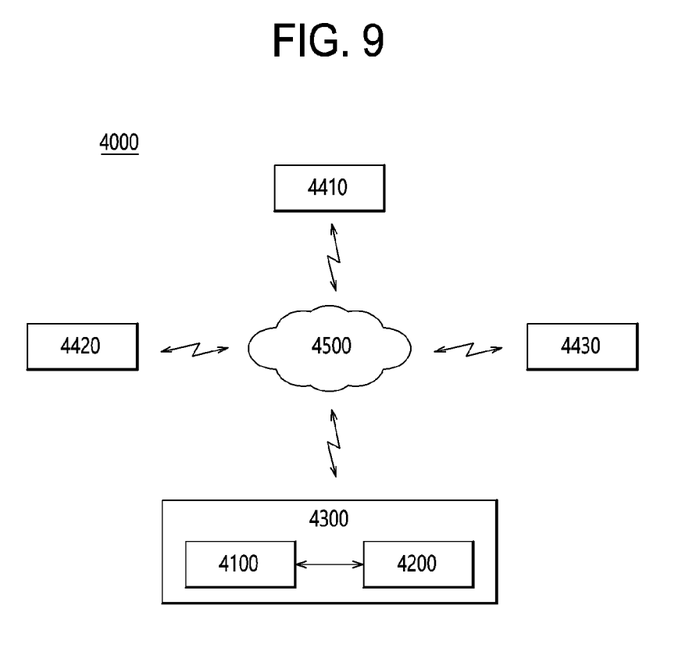
FIG. 9 is a diagram illustrating a network system including a memory system in accordance with an embodiment of the present disclosure.

FIG. 9 is a diagram illustrating a network system 4000 including a memory system 4200 in accordance with an embodiment of the present disclosure. Referring to FIG. 9, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be configured by the memory system 100 shown in FIG. 1, the SSD 1200 shown in FIG. 6, the memory system 2200 shown in FIG. 7 or the memory system 3200 shown in FIG. 8.

Figure 10:
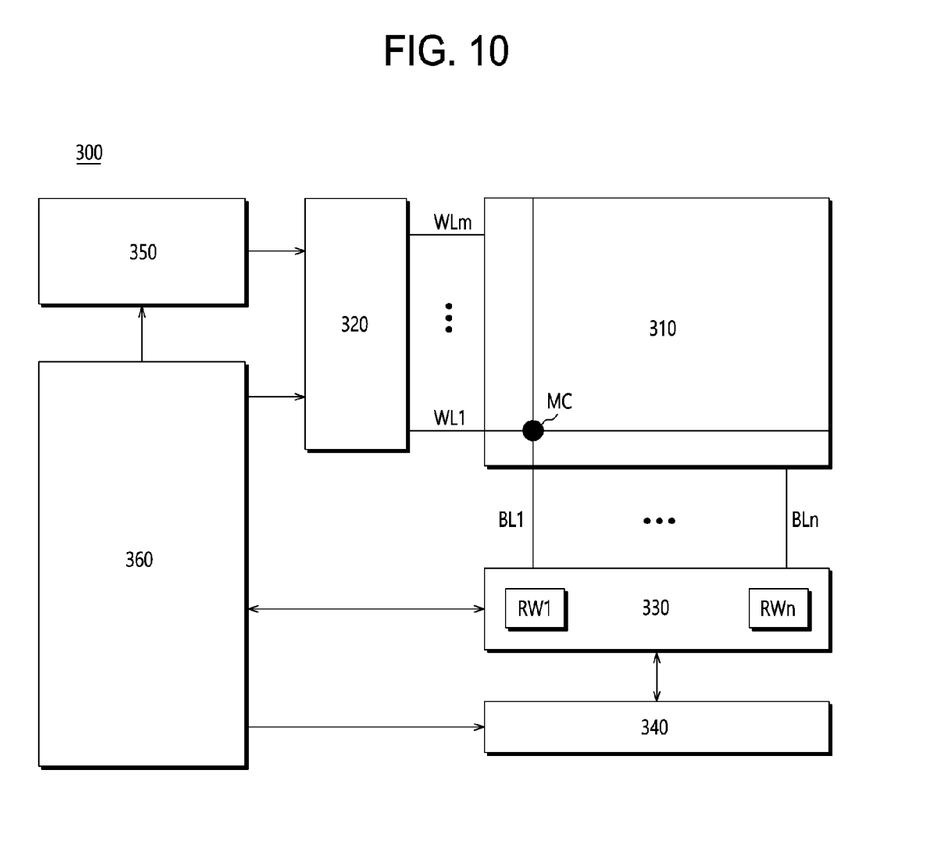
FIG. 10 is a block diagram illustrating a nonvolatile memory device included in a memory system in accordance with an embodiment of the present disclosure.

FIG. 10 is a block diagram illustrating a nonvolatile memory device 300 included in a memory system in accordance with an embodiment of the present disclosure. Referring to FIG. 10, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

In accordance with an embodiment, the controller of the memory system and the operating method thereof may delay the temperature rise of the memory system to provide an improved response performance to the host device.

While certain embodiments have been described above, it will be understood to those skilled in the art that the embodiments described are by way of example only. Accordingly, the controller of memory system and the operating method thereof should not be limited based on the described embodiments. Rather, the controller of memory system and the operating method thereof described herein should only be limited in light of the claims that follow when taken in conjunction with the above description and accompanying drawings. Furthermore, the embodiments may be combined to form additional embodiments.

What is claimed is:

1. A memory system comprising:
a memory device; and
a controller suitable for enqueuing operation requests provided from a host device into a request queue and controlling the memory device according to the operation requests,
wherein the controller estimates temperature increments respectively corresponding to the operation requests; and
performs a re-ordering operation for re-arranging the operation requests enqueued in the request queue based on the temperature increments, and
wherein the controller performs the re-ordering operation by re-arranging a random request and a sequential request among the operation requests such that the random request is re-arranged to be dequeued earlier than the sequential request from the request queue when the temperature increments respectively corresponding to the random request and the sequential request have the same value.

2. The memory system of claim 1, wherein the controller estimates the temperature increments by calculating, as one of the temperature increments corresponding to one of the operation requests, a temperature amount of the memory system, the temperature amount being estimated to increase as the corresponding operation request is processed.

3. The memory system of claim 1,
wherein the controller estimates the temperature increments by calculating one of the temperature increments corresponding to one of the operation requests based on consumed power information and operation request information corresponding to the operation request, and
wherein the consumed power information includes information of at least one of average consumed power and peak consumed power corresponding to the operation request, and the operation request information includes information of data size corresponding to the operation request.

4. The memory system of claim 1, wherein the controller performs the re-ordering operation by re-arranging the operation requests such that an operation request corresponding to a least temperature increment is re-arranged to be dequeued first from the request queue among the operation requests.

5. The memory system of claim 1, wherein the controller performs the re-ordering operation by re-arranging the operation requests in an ascending order of the temperature increments such that an operation request corresponding to a smaller temperature increment is re-arranged to be dequeued earlier than an operation request corresponding to a greater temperature increment from the request queue among the operation requests.

6. The memory system of claim 1, wherein the controller performs the re-ordering operation when a temperature of the memory system becomes greater than a re-ordering trigger temperature.

7. The memory system of claim 6, wherein the controller compares the temperature of the memory system with one or more performance adjustment trigger temperatures to perform a performance adjustment operation for adjusting performance of the memory system.

8. The memory system of claim 7, wherein the re-ordering trigger temperature is a first performance adjustment trigger temperature having a lowest value among the one or more performance adjustment trigger temperatures.

9. An operating method of a controller of a memory system, the operating method comprising:
estimating temperature increments respectively corresponding to operation requests provided from a host device; and
performing a re-ordering operation for re-arranging the operation requests enqueued in a request queue based on the temperature increments,
wherein the performing of the re-ordering operation includes re-arranging a random request and a sequential request among the operation requests such that the random request is re-arranged to be dequeued earlier than the sequential request from the request queue when the temperature increments respectively corresponding to the random request and the sequential request have the same value.

10. The operating method of claim 9, wherein the estimating of the temperature increments includes calculating, as one of the temperature increments corresponding to one of the operation requests, a temperature amount of the memory system, the temperature amount being estimated to increase as the corresponding operation request is processed.

11. The operating method of claim 9,
wherein the estimating of the temperature increments includes calculating one of the temperature increments corresponding to one of the operation requests based on consumed power information and operation request information corresponding to the operation request, and
wherein the consumed power information includes information of at least one of average consumed power and peak consumed power corresponding to the operation request, and the operation request information includes information of data size corresponding to the operation request.

12. The operating method of claim 9, wherein the performing of the re-ordering operation includes re-arranging the operation requests such that an operation request corresponding to a least temperature increment is re-arranged to be dequeued first from the request queue among the operation requests.

13. The operating method of claim 9, wherein the performing of the re-ordering operation includes re-arranging the operation requests in an ascending order of the temperature increments such that an operation request corresponding to a smaller temperature increment is re-arranged to be dequeued earlier than an operation request corresponding to a greater temperature increment from the request queue among the operation requests.

14. The operating method of claim 9, wherein the performing of the re-ordering operation includes performing the re-ordering operation when a temperature of the memory system becomes greater than a re-ordering trigger temperature.

15. The operating method of claim 14, further comprising comparing the temperature of the memory system with one or more performance adjustment trigger temperatures to perform a performance adjustment operation for adjusting performance of the memory system.

16. The operating method of claim 15, wherein the re-ordering trigger temperature is a first performance adjustment trigger temperature having a lowest value among the one or more performance adjustment trigger temperatures.

17. A memory system comprising:
a memory device; and
a controller suitable for enqueuing operation requests provided from a host device into a request queue and controlling the memory device according to the operation requests,
wherein the controller estimates temperature increments respectively corresponding to the operation requests,
re-arranges, when a temperature of the memory system becomes greater than a re-ordering trigger temperature, the operation requests enqueued in the request queue based on the temperature increments such that a temperature rise of the memory system is delayed, and
compares the temperature of the memory system with one or more performance adjustment trigger temperatures to change a performance mode of the memory system, and
wherein the controller performs the re-ordering operation by re-arranging a random request and a sequential request among the operation requests such that the random request is re-arranged to be dequeued earlier than the sequential request from the request queue when the temperature increments respectively corresponding to the random request and the sequential request have the same value.

* * * * *